(12) United States Patent
Shilpiekandula et al.

(10) Patent No.: US 8,513,906 B2
(45) Date of Patent: Aug. 20, 2013

(54) BASE VIBRATION ATTENUATION AND LOAD TRACKING IN MECHANICAL SYSTEMS

(75) Inventors: Vijay Shilpiekandula, Boston, MA (US); Scott A. Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 59 days.

(21) Appl. No.: 13/215,339

(22) Filed: Aug. 23, 2011

(65) Prior Publication Data

US 2013/0049671 A1 Feb. 28, 2013

(51) Int. Cl.
*H02P 5/50* (2006.01)
*H02K 33/00* (2006.01)
*G05B 1/06* (2006.01)

(52) U.S. Cl.
USPC ............. 318/127; 318/128; 318/70; 318/653; 360/75

(58) Field of Classification Search
USPC ....................... 360/75; 318/127, 128, 70, 653
See application file for complete search history.

(56) References Cited

U.S. PATENT DOCUMENTS

2007/0291399 A1* 12/2007 Kamimura et al. ............. 360/75

OTHER PUBLICATIONS

Gessing, R:, "About robustness of the reduced order Luenberger observer," control and automation (MED), 2011 19th mediterranean conference on, vol., no., pp. 230-235, Jun. 20-23, 2011 doi: 10.1109/MED.2011.5983701.*

* cited by examiner

*Primary Examiner* — Eduardo Colon Santana
*Assistant Examiner* — Bickey Dhakal
(74) *Attorney, Agent, or Firm* — Dirk Brinkman; Gene Vinokur

(57) ABSTRACT

A hybrid controller for a mechanical system includes an actuator configured to position a load. A vibration attenuation controller produces a vibration attenuation control signal in response to an input signal for the mechanical system. A tracking controller configured produces a tracking control signal in response to the input signal. In response to an output signal from the mechanical system, either the vibration attenuation control signal or the tracking control signal is switched as a control signal for the mechanical system to reduce both vibration in the mechanical system and improve tracking the load.

10 Claims, 5 Drawing Sheets

100

500

# BASE VIBRATION ATTENUATION AND LOAD TRACKING IN MECHANICAL SYSTEMS

FIELD OF THE INVENTION

This invention relates generally to controlling mechanical systems, and more particularly to reducing vibrations in mechanical systems while tracking loads.

BACKGROUND OF THE INVENTION

Increasing demands for high throughput and precision performance of machine tools dictate increasingly stringent requirements on machining tolerances and part-processing times. Such requirements in turn require a high machine tool positioning bandwidth, and command-following accuracy. In meeting such stringent performance requirements, and given a broad spectrum of disturbances in the machining environment, it becomes important to identify the source of the disturbances and effectively handle propagation of such disturbances from the source to the tool output.

A major source of disturbances in machine tools is low-frequency vibrations of base platforms on which the machine tools are mounted. Such vibrations occur typically in the 1-1.0 Hz range. The vibrations result from an inherent flexibility of the base. A challenging aspect of such vibrations is that they are lightly damped, resulting in long-tailed transients and settling times, which are detrimental to tracking performance in the machine tools.

Many advanced command generation techniques, such as input shaping, and control techniques involving feedforward and feedback, are known for minimizing residual vibrations.

It is desired to attenuation of residual vibrations not only in the tool or load output, but also the source, i.e., the base platform supporting the machine tool. Attenuating vibrations of the base platform is critical to minimizing cross-talk and propagation of disturbance between machine tools supported on the same base platform. For these dual requirements of achieving acceptable tracking performance, i.e., high bandwidths or low settling times, as well as the attenuation of base vibrations, a single linear controller is limited by inherent performance tradeoffs.

SUMMARY OF THE INVENTION

A common problem in factory automation applications is lightly damped vibrations of base platforms used for supporting machine tools. Such vibrations arise from the inherent flexibility and low physical damping of the base platforms. The lightly damped base vibrations pose critical challenges in achieving performance specifications such as high tracking bandwidth or low settling times for the machine tools. Any external disturbances from the environment, or the servo torques applied to position the load, can cause the base to vibrate.

The embodiments of the invention provide a hybrid controller and method that concurrently attenuate base vibration and fast load positioning. The controller automatically switches between a vibration attenuation controller and a position tracking controller, with the switching based on a state-dependent logic determined by a state observer.

The overall mechanical system includes an actuator-driven positioning stage mounted on a flexible base platform. The controller is simple in its formulation, tuning, and implementation, and does not require a feedback sensor for measuring the base vibrations.

Therefore, we use the hybrid controller that switches between two linear controllers. One controller is dedicated to vibration attenuation and the other controller is dedicated to load tracking for machine tools supported on flexible base platforms.

The controller can achieve attenuation of measured peak-to-peak values of base vibrations about six times better than a conventional baseline linear proportional-integral-derivative PID) controller. Further, the measured 5% settling time for tracking a reference step input for the controller is 2.5 times faster than conventional controllers.

DETAILED DESCRIPTION OF THE PREFERRED EMBODIMENT

Mechanical System

Figure 1:
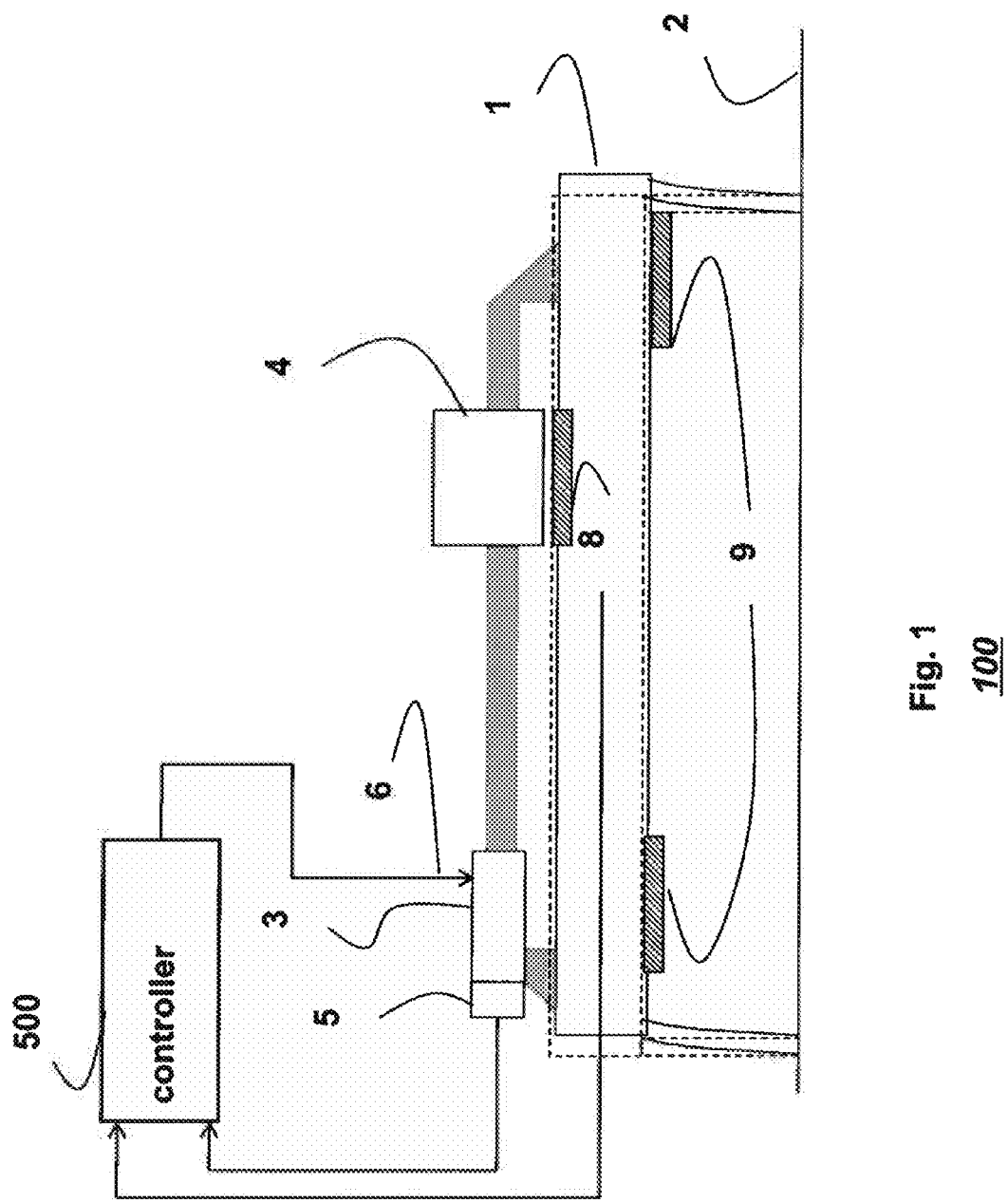
FIG. 1 is a schematic of a mechanical factory system with a hybrid controller according to embodiments of the invention.

FIG. 1 shows a mechanical system 100 with a hybrid controller 500 designed according to embodiments our invention. The hybrid controller reduces both vibrations and enables fast load positioning.

The system includes a motion stage supported by a base 1, which rests on the shop floor 2. An actuator 3, e.g., a servomotor is used to drive a load 4 using a transmission such as a belt drive or a recirculating ball screw. A rotary relative encoder 5 measure the angular displacement of the motor in real-time for a control signal 6 generated by controller 500. A linear sensor 8 is mounted on the load 2 measure its position relative to the base in real time. The load position is also used in the controller 500. Such linear motion stages are components of many machine tools, and are hence the focus of this invention. One or more vibration sensors 9 are mounted on the base to measure an amplitude of the vibration. In the preferred embodiment, the position of the load and the amplitude of the vibrations are not used for feedback control, they are only used for performance evaluation of the system.

The target performance requirements for this system are to achieve fast settling times for smoothed step command inputs to the actuator, and to minimize vibrations in the load position, e.g., caused by command inputs and disturbances, as well as the base position. The target requirements are net under the following practical constraints. The only actuator in the system is the rotary servomotor driving the machine tool axis. In the preferred embodiment, the only feedback sensor to be used in real-time for control is the encoder 5 on the actuator or the load, and no direct measurements of position, velocity, or acceleration of the base vibrations are used. These constraints stem from practical considerations of the design of the controller used in a noisy factory environment for the case of a single base platform supporting an actuator and load.

Performance Tradeoffs With Conventional Single Linear Controller

In conventional methods, such as H∞-synthesis, a single linear controller has fundamental performance limitations. The performance limitations motivate the hybrid controller 500 according to embodiments of the invention, instead of a single linear controller as in the prior art.

Figure 2:
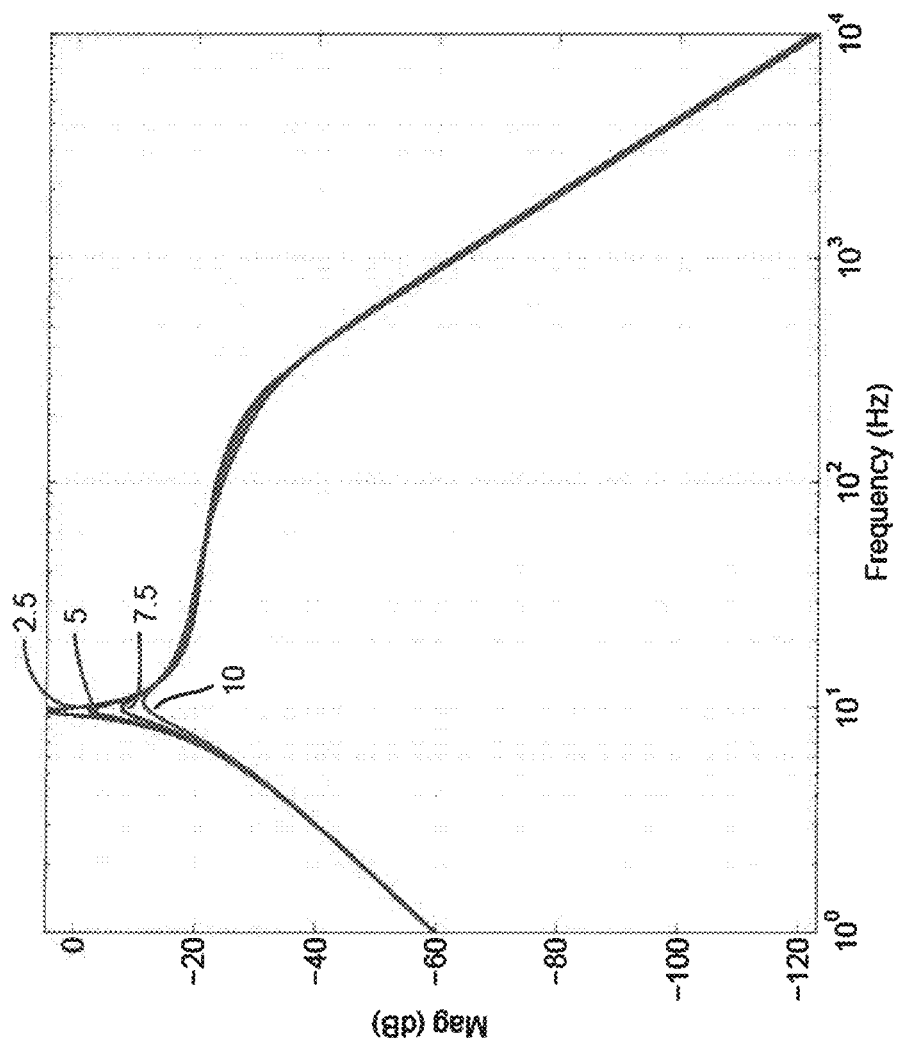
FIG. 2 is a graph of the magnitude of the frequency response of the gain transfer function of conventional linear controller from disturbance to base vibration amplitude for increasing weight on sensitivity.

For a single linear controller design, FIG. 2 shows the magnitude plot of the gain transfer functions from disturbance to base vibration amplitude for increasing weight on the sensitivity. As the weights increases, there is a corresponding decrease in the peak amplitude in the sensitivity magnitude plot.

Here, the magnitude response, representing the gain from the disturbance to the base vibration amplitude, is shown for different weights selected for the base vibration sensitivity transfer function. The larger the weight used for this function, the shorter the peak in the magnitude transfer function near 10 Hz, which is the natural frequency selected as an example value for the fundamental base vibration mode.

Figure 3:
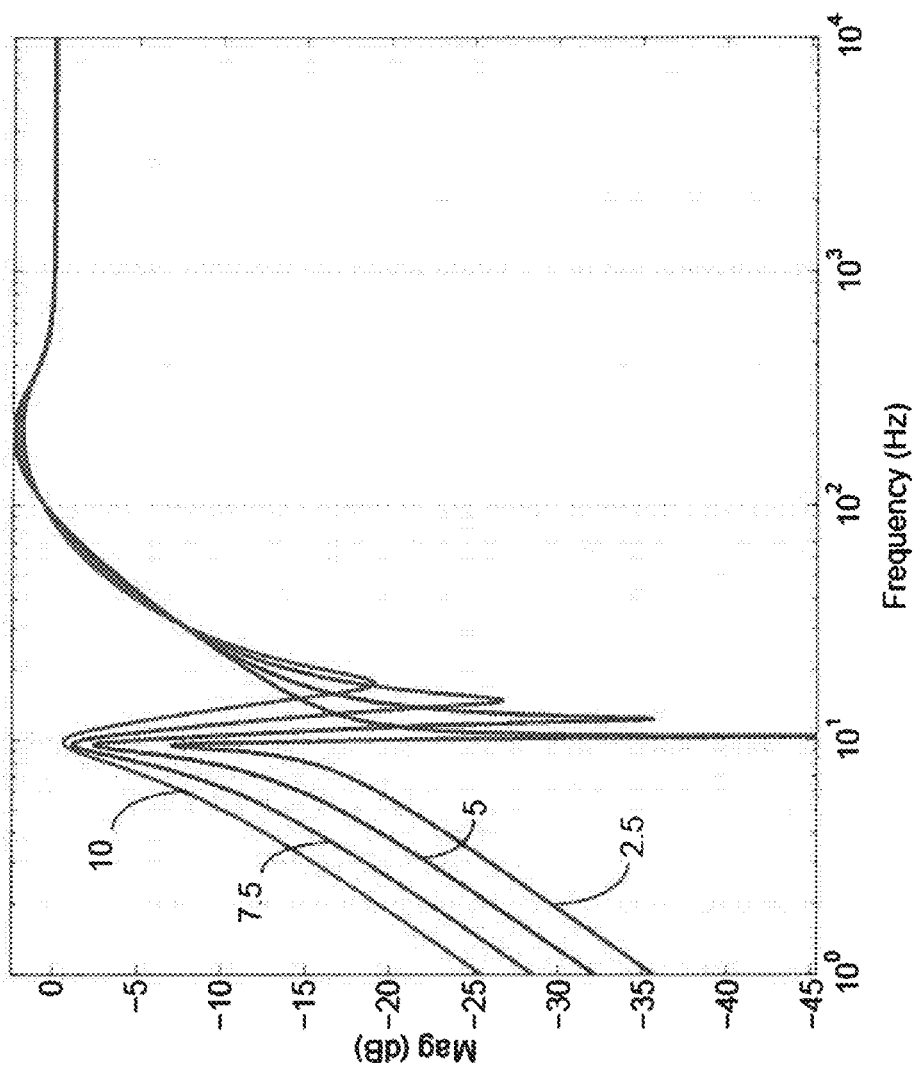
FIG. 3 is a graph of the corresponding effect of increasing base vibration sensitivity weights on the tracking error sensitivity transfer function.

FIG. 3 shows the corresponding effect of increasing base vibration sensitivity weights on the tracking error sensitivity transfer function. Here, the magnitude response of the error sensitivity transfer function, representing the gain from the disturbance to the tracking error, is shown for different weights selected for the base vibration sensitivity transfer function. For increasing weights, the peak in the magnitude transfer function around the base vibration fundamental frequency increases in height, and further reduces the −3 dB sensitivity bandwidth of the closed-loop system.

For a single linear controller designed using the H∞-synthesis, it is determined from FIGS. 2 and 3 that for a 16 dB attenuation in the base vibration amplitude, there is a decrease in tracking bandwidth, and a corresponding increase in the settling time, by about a factor of nine. Hence, we have shown that under the H∞-framework, using a single linear controller results in a performance tradeoff. The more the base vibration attenuation—the smaller the tracking bandwidth, and slower the system time response—the longer the settling times.

Hybrid Controller

Figure 4:
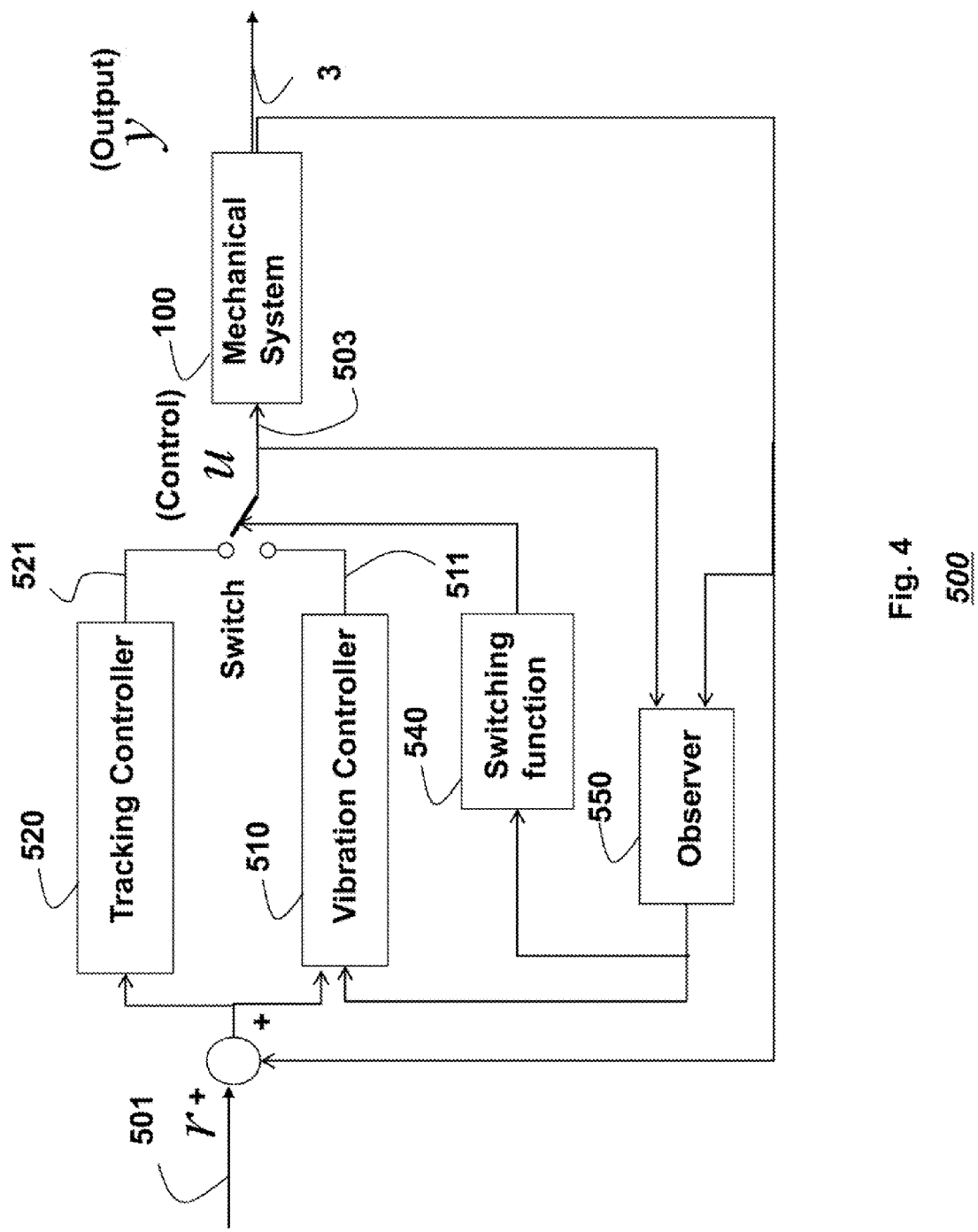
FIG. 4 is block diagram of a controller according to embodiments of the invention.

FIG. 4 shows our hybrid controller 500 including a vibration attenuation controller 510 configured to produce a vibration attenuation control signal 511 in response to the input reference signal 501, and a position tracking controller 520 configured to produce a tracking control signal 521 in response to the input signal. The system is responsive to a input reference signal r(t) 501, which can be prefiltered, or input-shaped. A switching function 540 is based on the control input and full state, measured, or the reconstructed state by a state observer 550. The function switches either the vibration attenuation control signal 511 or the tracking control signal as is the control signal u(t) 503 to the system 100. It should be noted that the steps performed by controller 500 can be implemented in a processor including memory and input/output interfaces as known in the art.

The controller concurrently attenuates base vibration and precise position tracking responsive to the input reference signal 501. The switching function automates the state-dependent switching between the two controllers.

State Observer

In control theory, a state observer models a real mechanical system to estimate the internal state, given measurements of the input and output of the system. We use a computer-implemented model. That is, the model is implemented in a processor. Knowing the system state is necessary to stabilize the system using state feedback. However in many practical implementations, the physical state of the system cannot be determined by direct measurements observation. Instead, indirect effects of the internal state are observed by way of the system outputs. In particular, we use a so-called Luenberger state observer.

Given the constraint that we do not use a feedback sensor for measuring the base vibrations, our reduced order Luenberger state observer is derived and realized in software to estimate the base position from measured signals. For monitoring base vibrations for testing purposes only, and not for implementing feedback control, the accelerometer 9 is mounted on the base to measure base accelerations.

The dynamic model-based state observer is constructed using the output signal y(t) 3 of the mechanical system. The observer estimates the base position and vibration attenuation control signal that is required for the base vibration attenuation controller 510.

Control Considerations

As known in the art, state and output equations can be derived for the system using a linear time-invariant model derived from physics-based modeling or system identification experiments, in the following form, $$\dot{x}(t)=Ax(t)+Bu(t) \qquad (1)$$

$$y(t)=Cx(t) \qquad (2)$$

where A, B, C, are system matrices, x(t) is a vector of state x of the system and y(t) is the measured output of the system. For example, the state can be comprised of load position, load velocity, base position, and base velocity, and the output can be the measured load position.

Consider the control signal u(t) 503 as defined below:

$$u(t)=\alpha u_b(t)+(1-\alpha)u_r(t) \qquad (3)$$

where, $u_b(t)$ is the vibration attenuation control signal, $u_r(t)$ is the tracking control signal, and α is a scalar that a value of 0 or 1. The value of α is determined by a switching function $f(t)$ 540 as follows:

$$\begin{aligned}\alpha &= 0 \quad f(t) \geq 0 \\ &= 1 \quad f(t) < 0.\end{aligned} \qquad (4)$$

In other words, the reference tracking controller 520 is selected when the switching function $f(t) \leq 0$, and at other times, the base vibration attenuation controller 530 is selected. Unlike solutions based on open-loop time-switching, here the switching occurs in a state-dependent manner, and closed-loop stability and performance requirements, i.e., settling time and vibration attenuation, determine switching times.

To meet the stability and performance requirements, we relate the switching function $f(t)$ to the full measured state, or as in our case reconstructed by the state observer 550, of the system.

Many methods can be used for designing tracking and base vibration controllers individually. For example, we use a linear quadratic regulator (LQR) in this embodiment. With tunable weights on states and control inputs in user-defined cost functions, linear quadratic regulators can optimize the closed-loop system for the performance requirements of fast settling times and reduced vibration. However, our framework can work with any control law for load position tracking and base vibration attenuation. Under this framework, we describe a design for the switching function $f(t)$, and provide guarantees for stability of the closed-loop switched system.

We define the switching function $f(t)$ as $$f(t)=x^T\{A^T(P_r-P_b)+(P_r-P_b)A-2(P_r-P_b)BR_b^{-1}B^TP_b\}x, \quad (5)$$

where A, B are system matrices as defined in Eqs. (4-8), and symmetric positive definite matrices $P_r>0$ and $P_b>0$ are solutions to infinite-horizon Riccati equations given as follows:

$$A^TP_r+P_rA-P_rBR_r^{-1}B^TP_r+Q_r=0 \quad (6)$$

$$A^TP_b+P_bA-P_bBR_b^{-1}B^TP_b+Q_b=0 \quad (7)$$

where matrices $Q_r \leqq 0$ and $Q_b \geqq 0$ are user-defined penalties on the state cost of the system. User-defined penalties on the control cost are $R_r>0$, $R_b>0$.

In terms of the above-defined matrices, $u_b(t)$ is the vibration attenuation control signal, $u_r(t)$ is the tracking control signal, of Eq. (3) are affine functions of the state and are given by:

$$u_b(t)=-R_b^{-1}B^TP_bx(t)=k_bx(t)$$

$$u_r(t)=-R_r^{-1}B^TP_rx(t)=k_rx(t) \quad (8)$$

We use a common physical energy-based Lyapunov function of the system Lyapunov function $$V(t)=x^T(t)P_rx(t), \quad (9)$$

which represents the virtual energy of the closed-loop switched system, with $P_r$ as defined in Eq. (6).

The corresponding rate of change of this function is:

$$\dot{V}(t)=\alpha f(t)+\chi^T[\alpha(-Q_b-P_bBR_b^{-1}B^TP_b)+(1-\alpha)(-Q_r-P_rBR_r^{-1}B^TP_r)]\chi \quad (10)$$

Given the switching law defined in Eqs. (4-5), it follows that in Eq. (9) the first term is $\alpha f(t) \leqq 0$. Furthermore, the second term in Eq. (10) is negative definite based on the definitions of the state and control penalties. Hence, it follows that $\dot{V}(t)<0$, and because $V(t)>0$, the origin is a globally asymptotically stable equilibrium point for the system.

To quantify the rate of decay of the Lyapunov function, from an eigen value analysis, it can be shown that:

$$\dot{V}(t) \leq -\frac{\lambda_{min}\{Q_u\}}{\lambda_{max}\{P_r\}}V(t) \quad (11)$$

where $$Q_u=\mathrm{argmin}[\lambda_{min}\{Q_b+P_bBR_b^{-1}B^TP_b,Q_r+P_rBR_r^{-1}B^TP_r\}] \quad (12)$$

and the corresponding inequality for the state reduces to:

$$\|x(t)\| \leq e^{\left[-\frac{\lambda_{min}\{Q_u\}}{2\lambda_{max}\{P_r\}}\right]}\sqrt{k\{P_r\}}\|x(0)\|. \quad (13)$$

where $\lambda(\cdot)$ and $k(\cdot)$ denote an eigen value and condition number, respectively, of the matrix $(\cdot)$. Because this inequality holds for all initial conditions $x(0)$, the origin is an globally exponentially stable equilibrium point for the system, and the rate of convergence to the origin is:

$$\frac{1}{2}\frac{\lambda_{min}\{Q_u\}}{\lambda_{max}\{P_r\}} \quad (14)$$

The physical interpretation of the above equations is as follows. The selected Lyapunov function represents a hyper-paraboloid centered around the origin in the state space. For any initial conditions of the system, the system trajectories converge to the origin at an exponential rate given by at least the rate of convergence derived above. Therefore, the function $f(t)$ switches between the two controllers to ensure that $\dot{V}(t)$ is negative and as large as possible in magnitude.

In essence, we are maximizing the decay rate of the virtual energy of the closed-loop switched system. For a vibration disturbance that dissipates stored potential energy of the flexible base, the above switching function enables the appropriate actuator torque to be applied to maximize the rate of the dissipation. Similarly, for achieving load tracking, the switching function enables the control input to maximize the rate of dissipation of the virtual potential energy associated with the tracking error.

Figure 5:
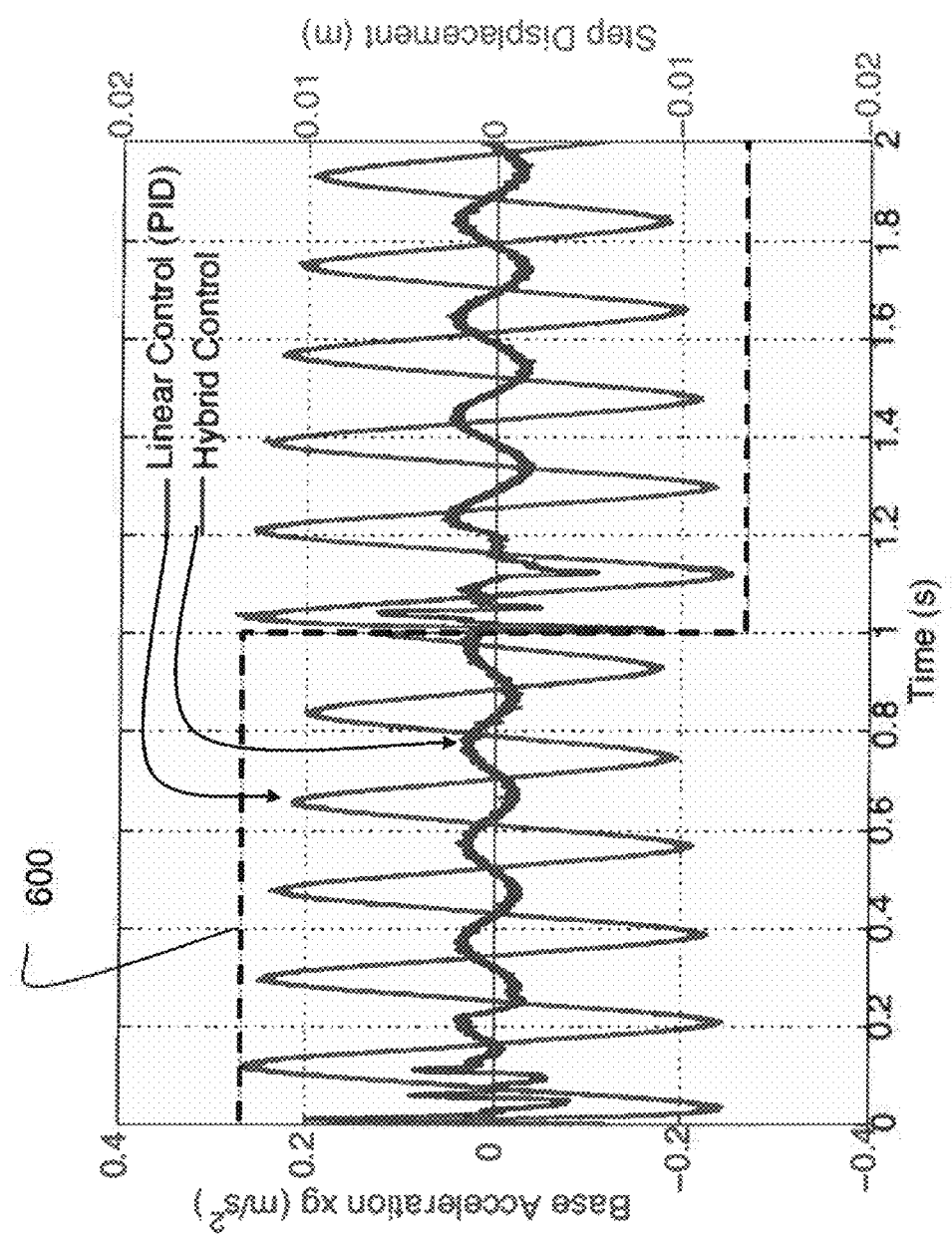
FIG. 5 is a graph comparing vibration reduction with a conventional linear controller and a hybrid controller according to embodiments of the invention.

FIG. 5 compares the performance of the system for base vibration attenuation with a conventional linear controller (PID) and our hybrid controller 500, with a square wave 600 command input according to embodiments of the invention. When compared with the conventional PID controller, our controller improves base vibration attenuation by approximately six times, while reducing settling time by a factor of 2.5.

In further embodiments of the invention, the common Lyapunov function of Eq. (8) can be selected as:

$$V(t)=x^T(t)Px(t) \quad (15)$$

where P is selected as a symmetric positive definite matrix that represents a virtual cost function for the system depending on the elements of P. For example, P can be a diagonal matrix with elements selected to penalize base vibrations more than motor or load position. Furthermore, P can also be selected to satisfy the following linear matrix inequality, which can be solved using efficient convex optimization algorithms.

$$\begin{bmatrix} (A+Bk_r)^TP+P(A+Bk_r) & 0 \\ 0 & -P \end{bmatrix} < 0 \quad (16)$$

For the choice of P in Eq. (16), one solution to the switching function $f(t)$ of Eq. (4)), aimed at maximizing the rate of decay of the Lyapunov function, is as follows:

$$f(t)=x^T\{A^T(P-P_b)+(P-P_b)A-2(P-P_b)BR_b^{-1}B^TP_b\}x \quad (17)$$

Note that $P=P_r$ is one solution of Eq. (16), which when used in Eq. (17) reduces the switching function to the same as in Eq. (5). Thus, Eq. (15) represents a general embodiment, and we recover the specific embodiment of Eq. (9) from it with the choice of $P=P_r$.

Other variations in the formulation can be in the form of constraints on control and state inputs. Recent advances in areas of model predictive control have shown that in fact even under constraints, the control inputs are indeed affine in the state. Hence, the presented embodiment of the hybrid controller can be extended to include state and control constraints as well.

EFFECT OF THE INVENTION

The embodiments of the invention reduce vibration while enabling fast load positioning for a mechanical system in a noisy factory environment. It is not possible to achieve this goal with a conventional single linear controller.

Our hybrid feedback controller uses a Lyapunov function, and a state-dependent switching control law. This framework addresses both settling time and vibration attenuation requirements through easy-to-tune linear quadratic regulators.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An apparatus for controlling a mechanical system including an actuator configured to position a load, comprising:
    a vibration attenuation controller configured to produce a vibration attenuation control signal in response to an input signal for the mechanical system;
    a tracking controller configured to produce a tracking control signal in response to the input signal; and
    means for switching, in response to an output signal from the mechanical system, either the vibration attenuation control signal or the tracking control signal as a control signal for the mechanical system to reduce both vibration in the mechanical system and improve tracking the load, wherein the vibration attenuation control signal is $u_b(t)$, the tracking control signal is $u_r(t)$, and the control signal is $u(t)=\alpha u_b(t)+(1-\alpha)u_r(t)$, where, $\alpha$ is a scalar that has a value of 0 or 1 determined by a switching function $f(t)$ as follows $$\alpha = 0 \; f(t) \geq 0$$
$$= 1 \; f(t) < 0.$$

2. The apparatus of claim 1, wherein the output signal is an angular position of the mechanical system in real-time.

3. The apparatus of claim 1, further comprising:
    a state observer having as input the output signal and as output a reconstructed state of the mechanical system for the vibration attenuation controller.

4. The apparatus of claim 3, wherein the state observer is a reduced order Luenberger state observer.

5. The apparatus of claim 1, wherein the switching occurs in a state-dependent manner, and closed-loop stability and performance requirements determine times of the switching.

6. The apparatus of claim 1, wherein the switching function $f(t)$ is designed to maximize a rate of decay of a physical energy of the system.

7. The apparatus of claim 1, wherein switching function $f(t)$ is $$f(t)=x^T\{A^T(P_r-P_b)+(P_r-P_b)A-2(P_r-P_b)BR_b^{-1}B^TP_b\}x,$$

where x are states in a stale vector x, A and B are system matrices determined from a physical model $P_r$ and $P_b$ are solutions to infinite-horizon Riccati equations $$A^TP_r+P_rA-P_rBR_r^{-1}B^TP_r+Q_r=0$$

$$A^TP_b+P_bA-P_bBR_b^{-1}B^TP_b+Q_b=0,$$

where T is a transpose operator, and matrices $Q_r \leq 0$ and $Q_b \geq 0$ are user-defined penalties on the state cost of the mechanical system, and penalties on the control cost are $R_r>0$, $R_b>0$.

8. The apparatus of claim 7, wherein the switching function $f(t)$ is maximizes a rate of decay of a physical energy of the system.

9. The apparatus of claim 7, wherein the switching function $f(t)$ is selected as:

$$f(t)=x^T\{A^T(P-P_b)+(P-P_b)A-2(P-P_b)BR_b^{-1}B^TP_b\}x.$$

10. The apparatus of claim 1, wherein the vibration attenuation control signal $u_b(t)$ is designed to achieve vibration attenuation for narrow and broad band vibrations of the base.

* * * * *